Aug. 24, 1948. P. L. J. MIGUET ET AL 2,447,809
ELECTROTHERMIC GAS PRODUCER
Filed Sept. 1, 1942 2 Sheets-Sheet 1

Inventors:
PAUL LOUIS JOSEPH MIGUET
MARCEL PAUL PERRON
By Haseltine, Lake & Co. Attorneys.

Aug. 24, 1948.  P. L. J. MIGUET ET AL  2,447,809
ELECTROTHERMIC GAS PRODUCER
Filed Sept. 1, 1942  2 Sheets-Sheet 2
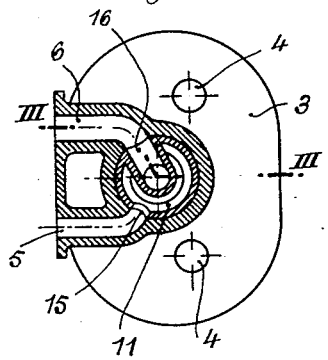
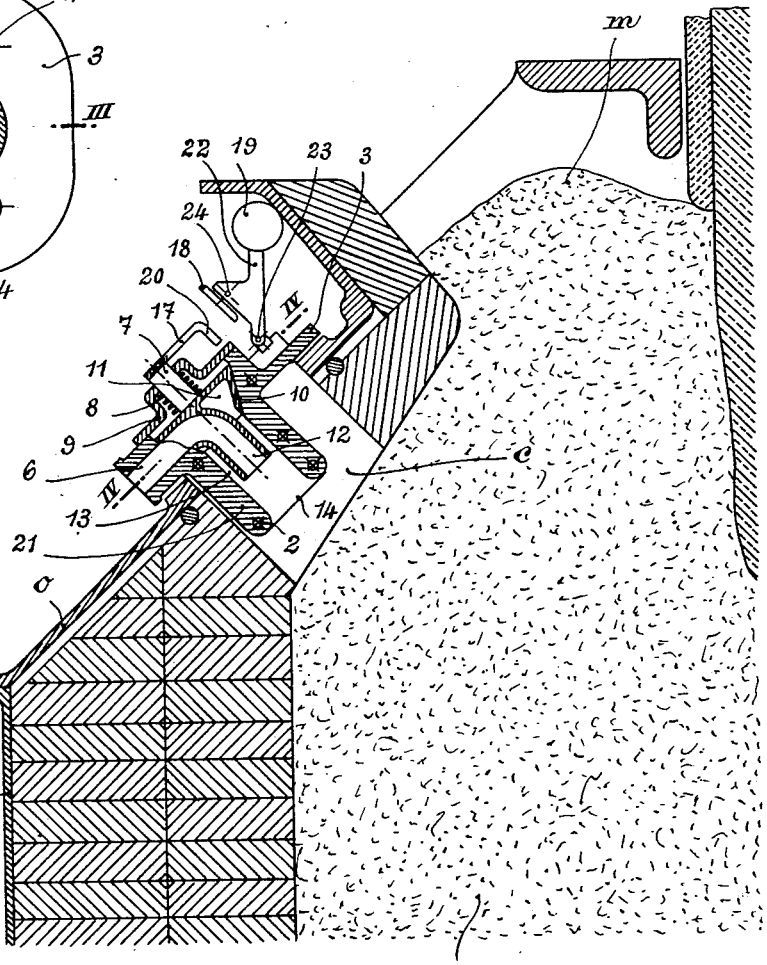
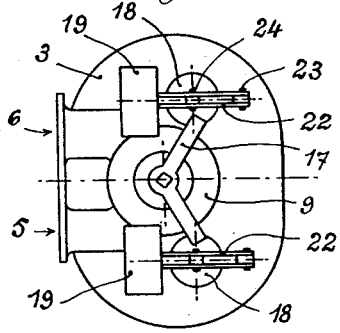
Inventors:
PAUL LOUIS JOSEPH MIGUET
MARCEL PAUL PERRON
By Haseltine Lake & Co. Attorneys.

Patented Aug. 24, 1948

2,447,809

UNITED STATES PATENT OFFICE 2,447,809

ELECTROTHERMIC GAS PRODUCER

Paul Louis Joseph Miguet and Marcel Paul Perron, Saint-Julien-de-Maurienne, France; vested in the Attorney General of the United States Application September 1, 1942, Serial No. 456,950
In France May 21, 1941

10 Claims. (Cl. 23—277)

As is known, the use of electrical energy for producing the necessary heat and so raising the temperatures of reactions in industrial furnaces while so meeting the endothermic requirements as to generate plant gas was already contemplated. However, no practical application ensued owing to the absence of a suitable appliance capable of fulfilling the aforesaid requirements.

An object of the present invention is to provide a new or improved electric furnace adapted to work as an electrothermic gas producer fulfilling said requirements and ensuring steady and reliable operation while lending itself to an easy adaptation to industrial conditions by only requiring to be energized at certain spaced periods of time as for example during off-peak hours when current is cheaper or easier to supply.

Another object of the invention is to provide an electrothermic gas producer wherein the resultant ashes may be discharged in the form of slags or alloys of metals reductible by carbon under usual service conditions.

A further object of the invention is to provide an electrothermic gas producer utilisable for the manufacture of alloys and metal carbides on a large industrial scale while giving rise to a substantial evolution of carbon monoxide.

A still further object of the invention is to provide an electrothermic gas producer lending itself to the easy recovery of carbon monoxide arising from the manufacture of alloys and metal carbides and also to the collection of vapors of metals such as zinc and magnesium, and to all processes wherein gases or vapors are extracted or converted.

With these and such other objects in view as will incidentally appear hereafter, the invention comprises the novel construction and combination of parts that will now be described with reference to the accompanying diagrammatic drawings exemplifying the same and forming a part of the present disclosure.

In the drawings:

Figure 3 is a fragmentary vertical sectional view on the line III—III of Fig. 4 showing another embodiment of the invention in the form of a calcium carbide furnace provided with valve-controlled flues having a more elaborate structure than those shown in Fig. 1.

Figure 4 is a sectional view along the line IV—IV of Fig 3.

Figure 5 is a plan view of one of the improved flue devices.

Figure 1:
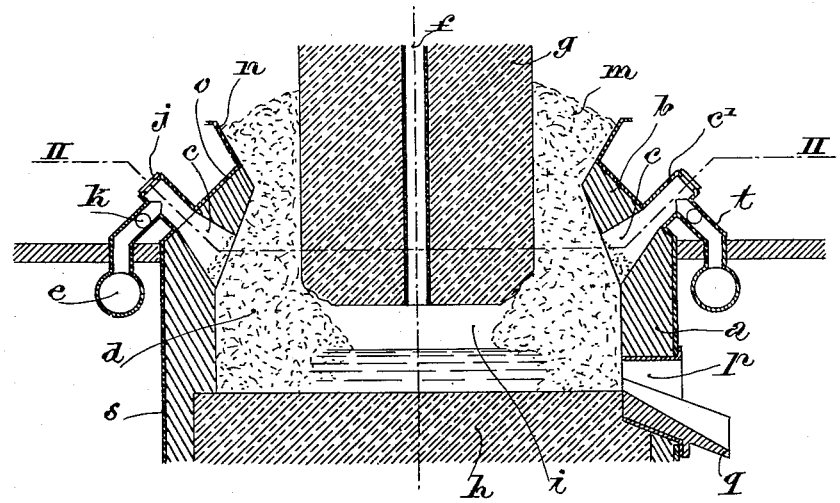
Figure 1 is a vertical sectional view of an improved gas producer constructed according to the invention, the section being taken along the line I—I of Fig. 2.

The improved gas producer is preferably of the so-called open type but this involves no limitation so far as the invention is concerned.

The gas producer shown in the drawings comprises a shaft defined by an outer shell $s$ having a cylindrical shape in its lower region and a frustum shape in its upper region, said shell being provided throughout its inner surface with a refractory lagging of substantial thickness. Such lagging is of uniform thickness at $a$ along the lower part of the shell $s$ and of gradually decreasing thickness at $b$ in the upper part $o$ of the shell to a line forming the extension of an outer flaring flange $n$ defining a charging hopper on the open top of the shell.

The region of the lagging whose thickness gradually diminishes is hollowed at regular intervals as shown at $c$ to provide outwardly and upwardly inclined flues having an outwardly decreasing cross sectional area. Such flues $c$ communicate at one end with the annular mass $d$ of materials undergoing reaction in the furnace and at the opposite end with upwardly projecting hollow cowls $c^1$ of uniform size whose open outer ends are closed by removable stoppers such as $j$. Each cowl $c^1$ is connected to one end of a downtake tube $t$ provided with a valve $k$. The opposite end of each downtake tube $t$ is connected to a ring-shaped collector or header $e$ which surrounds the shell $s$ at a certain distance from it. The collector $e$ is connected to suction-creating means (not shown) of conventional structure such as a drawing fan.

Into the furnace space or shaft downwardly projects a stout electrode $g$ axially bored at $f$ to allow steam, carbon dioxide or another suitable vapor or gas to be injected into the subjacent space $i$ inside the annular mass $d$ of materials to be processed in the furnace.

The electrode $g$ is conveniently connected to a suitable source of electric current. The voltage should advantageously vary between 25 and 45 volts depending upon the raw materials subjected to the treatment in the furnace.

The hearth or floor $h$ of the furnace is made of a conductive substance, and the current which arrives through the electrode $g$ flows over to said hearth across the annular reactive mass $d$ which is either inherently conductive or rendered conductive by being electrothermically heated.

The gas or vapor injected through the electrode bore *f* reaches the space *i* whence it is distributed to the surrounding mass of material *d* maintained at a suitable processing temperature by electrothermic action. The gases or vapors evolved by the reaction which then takes place percolate up through the annular mass *d* and are sucked through the flues *c* and header *e* and thence collected in suitable tanks (not shown) Before reaching such tanks, the gases or vapors may be caused to flow through heat recuperators of conventional structure.

The annular mass *d* of reactive materials should be poked periodically by means of slice bars or similar tools so as to be kept in such proper state of porosity as will enable the gases or vapors to be evolved and to flow up towards the flues *c*. Such poking can be readily effected after having removed the stopper *j* from the cowl $c^1$ and closed the valve *k* so as to locally cut off the suction through the corresponding flue.

The raw materials *m* to be electrothermically processed in the furnace are charged either by hand tools or by power operated means into the flared upper mouth *n* of the top part *o* of the shell *s* so as to fill up the empty spaces which are created in proportion as the materials of the annular mass *d* are treated and crumble down. The production of flames can be checked or controlled by coordinating the injection of gas or vapor through the electrode bore *f* and the degree of suction through the collector *e*. Such a coordination may be achieved either by the operator's own control or by an automatic controller.

The molten material or slag which collects below the bored electrode *g* can be discharged periodically and at more or less frequent time intervals through a tap hole *p* and along a chute *q* which may lead down to any container (not shown).

A gas producer thus constructed may be used for converting carbon dioxide into carbon monoxide or for recovering carbon monoxide from processes involving the production of alloys or metallic carbides or else for extracting vapors of such metals as zinc or magnesium, also more generally for miscellaneous conversions or extractions of gases and vapors.

When dealing with gases that are chemically non-sensitive to heat influences and contain a small quantity of dust as for example sulphur dioxide from alkaline-earth sulphates, a simple flue connected to a header as in the above described construction is sufficient. Where, however, the gases are directly subjected to balancing reactions and become dust-laden owing to side reactions such as carbon monoxide resulting from the manufacture of calcium carbide or such metal vapors as are highly sensistive to oxidization and are difficult to condense as for example magnesia from magnesia-bearing carbonates, the simple flues as above described are no longer sufficient.

In such a case, it is necessary to incorporate with such dust-laden gases subjected to balancing reactions similar gases but in dust-freed and cooled condition so as to instantaneously lower their processing temperature to a value below the lower limit of the unbalancing range. In circulatory pipings, such incorporation of clean and cool gases permits the speed to be so increased as to prevent clogging due to premature dust settling.

Where metal vapors are subjected to the influence of carbon monoxide which is always present owing to the electrode operation, hydrogen should also be incorporated so as to dilute the vapors and lessen said influence and at the same time to cool them quickly enough to permit the condensed metal to be readily collected and to preclude choking of the pipes beyond the condensers.

Moreover, in all cases, care should be taken to lessen the entrainment of dusts other than those arising from certain reactions by broadening the operative range of slice bars or like poking tools on both sides of the suction pipes. The mass of materials being processed is thus kept sufficiently pervious so that when gently evolving therefrom, the metallic gases or vapors are practically devoid of impetus. This also greatly reduces air intakes through the charging hopper.

Figure 2:
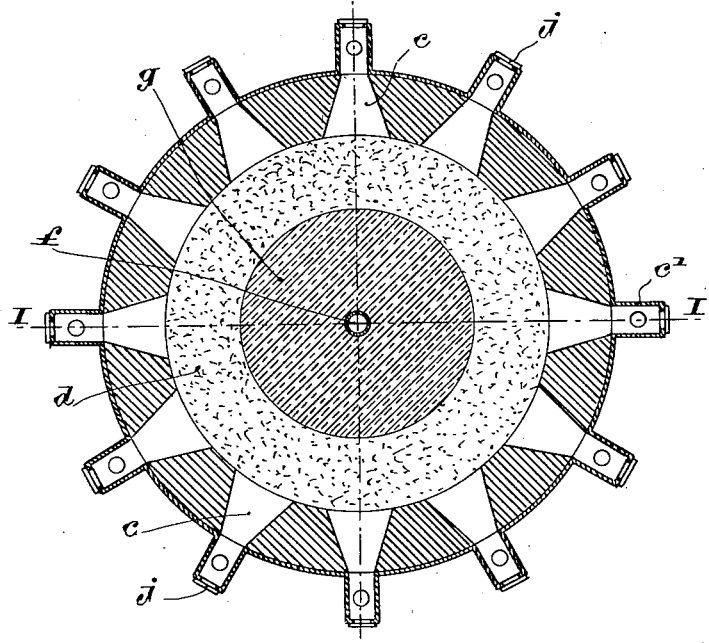
Figure 2 is a transverse sectional view taken along the irregular line II—II of Fig. 1.

In view of the foregoing, experimental tests may lead to substituting for such simple flues as are shown in Figs. 1 and 2 the more intricate flues shown in Figs. 3 to 5 inclusive and associated with mixing valves. Such flues comprise on both sides of the suction orifices a pair of poking ports or holes formed in a relatively thin wall so as to permit the slice bars or like tools to be inclined to a greater degree while the poking operation is carried out.

In the construction shown in Figs. 3 to 5, 21 is the casing of a valve or cock made of cast iron and having water circulation or cooling ducts 2. This casing 21 has a relatively thin flange 3 for the aforesaid purpose. This flange 3 rests on the upper part *o* of the furnace metal shell *s* to cover the flue *c*. Moreover, the casing 21 is provided with a pair of ports 4 (see Fig. 4) through which poking tools may be inserted and also with a pair of ducts 5, 6. The duct 5 is intended for the inflow of extraneous cold gases while the duct 6 serves for the outflow of the mixture of gases or vapors and extraneous gases, the mixing taking place in the valve.

The valve casing 21 is provided with a revoluble key 7 urged by a spring 8 abutted against the under face of a cap 9 towards a conical seat 10 which delineates an annular chamber 11 for the inflow of extraneous gases. A stub pipe 12 of elbowed outline cast integral with or otherwise rigidly fastened to the key 7 projects into the casing 21 and is adapted to simultaneously draw those cold extraneous gases which are sucked through the annular space 13 surrounding said pipe 12 and those hot gases or vapors that are sucked through the flue *c* and the inner end 14 of the valve casing 21. The annular chamber 11 which girdles the pipe 12 communicates through an aperture 15 (see Fig. 4) with the duct 5 while the stub pipe 12 communicates through an aperture 16 with the duct 6.

A V-shaped rotatable actuator 17 (see Fig. 5) makes it possible to simultaneously close off both ducts 5, 6 and to release valve disks 18 fitted with counterweights 19 so as to enable such disks to unmask the poking ports 4. These disks are locked between successive poking operations by being held down by the angularly bent ends 20 of the actuator arms 17. Each counterweight 19 is supported by an arm 22 having a fulcrum pin 23 and a pivotal pin 24 by which the plane disk 18 is carried by said arm.

It will be understood that owing to the provision of such flues equipped with mixing valves or cocks, hot gases and vapors are instantaneously cooled by cold gases and the extraction of the gaseous mixture is interrupted while the poking ports are opened so as to prevent any undue air or gas intake during manipulation of the slice bars.

Therefore this improved arrangement of the flues and valves presents the following advantages over the more simple arrangement of flues c shown in Fig. 1. Firstly, an instantaneous cooling of the gases or vapors extracted from the reactive mass being treated is obtained. Secondly, greater gas masses are set into circulation, whereby higher speeds are achieved which prevent any premature dust settlings. Thirdly, the stoppers or poking ports cannot be possibly opened while the flues or valves are in normal operation and vice versa.

Flues built in this way are advantageously grouped into sets of four or five to match the capacity of volumetric suckers used and that of the gas producers involved in the plant. Extracted gases or vapors are sent to gasometers through condensers where the latter are required and, in all cases, through hydro-centrifugal or electrostatic dust removers.

The provision of dust removers is important because extracted gases always contain important proportions of dusts. Thus apart from lime arising from the disintegration of a portion of the calcium carbide at overheated points, carbon monoxide arising as by-product from calcium carbide contains nearly all the magnesia due to the action of carbon monoxide upon magnesium issued from substantially thorough reduction of magnesia present in raw materials undergoing treatment.

In the case of carbon monoxide resulting from the manufacture of calcium carbide, care should be taken to first eliminate raw materials having too high a content of magnesia and to operate from natural calcareous substance which, for the same quantity of calcium carbide, gives rise to a gas which is three times less laden with dust because its volume is three times as large.

In practical operation on a manufacturing scale, the electrode $g$ may conveniently have a diamter equal to about four meters. In view of this, precautionary steps should be taken to protect the lower end of the electrode from the risk of breakage owing to its irregular nibbling to a so-called mushroom shape. It will be found by those skilled in the art that such steps can be easily determined whether when injecting steam or carbon dioxide or when the molten materials which collect upon the hearth $h$ contain silica, manganous oxide or metal carbides capable of being volatilised or disintegrated under service conditions. It will be found that vaporised water, carbon dioxide or vapors of silica, manganous oxide or metal carbides have the effect of whittling away the lower surface of the mass by a process of oxidation or decarburization. This, however, would cease to be the case were ordinary ashes replaced by magnesia and steam or carbon dioxide injections replaced by hydrogen injections.

So far as safety in the processing is concerned, atmospheric air cannot gain access to the sole gaseous pocket situated underneath the electrode $g$ without previously flowing through the annular mass of reactive material $d$ in which the oxygen contained therein is necessarily converted into carbon monoxide.

Any electric power up to 10,000 kilowatts may be used since an electrode having a diametrical size reaching four meters normally admits 400,000 amperes.

As regards suppleness of operation, and by way of analogy with frequent discontinuity as occurs when producing metallic carbide, in order to avoid any substantial loss of heat and undue nibbling of the electrode during off periods, it is only sufficient to cover the raw materials in the hopper with slack of a similar material as is current in the making of metallic carbide.

Moreover, as regards easiness of discharge of the ashes in the form of slags, clinkers or metal alloys, no greater difficulties are encountered than those exceptionally met when producing alloys or metallic carbides. Such difficulties can be always overcome by de-clogging the mass by striking an electric arc fed by current derived from the electrode input terminal.

Finally, as regards the adaptation of the process to all productions of alloys and metallic carbides which are accompanied by an evolution of carbon monoxide, it is obviously sufficient to substitute for carbonaceous material as used for the production of usual plant gas beds of molten material capable of giving rise to such alloys or metallic carbides.

As an exemplification of the way in which a furnace or gas producer according to the invention may be used, the following examples will now be given:

*Example I*

Where dealing with water gas according to the reaction $$C + H_2O \rightarrow CO + H_2$$

28,800 calories (or 34 kw. h.) consumptions for 10,000 cubic meters and an electrothermic efficiency of 70% are as follows:

kw. h. of reaction $= \frac{34}{44} \times 10,000 \times \frac{100}{70} = 11,040$ kw. h.

Coke 80% of C $= \frac{12}{44} \times 10,000 \times \frac{100}{80} = 3,420$ kilograms $H_2O$ steam $= \frac{18}{44} \times 10,000 = 4,100$ kilograms The relatively small quantity of Fe-Si, 25% as by-product, permits the expenses to be covered as regards kilowatt-hours, coke and iron scrap consumption. Vaporization of the water is performed by recovering heat derived from a gaseous extraction conducted at 100° C., but due allowance should be made for the kilowatt-hours corresponding to the spent heat, namely $$\frac{366}{864} \times 10,000 = 4,236 \text{ kilowatt-hours}$$

which for consumptions of 10,000 cubic meters of $(CO+H_2)$ gives totals equal to kilowatt-hours 15,276
coke 3,420 kilograms and per cubic meter 1.6 kilowatt-hour
.35 kilogram of coke.

*Example II*

For carbon monoxide from residual carbon dioxide due for instance to decomposition of steam by carbon, consumptions for 10,000 cubic meters obtained by the following reaction $$CO_2 + C \rightarrow 2CO - 38,800 \text{ calories (or 45 kw. h.)}$$

are as follows:

kw. h. of reaction: $\frac{45}{44} \times 10,000 \times \frac{100}{70} = 14,580$ kw. h.

Coke 80% of C $\frac{12}{44} \times 10,000 \times \frac{100}{80} = 3,420$ kilograms Residual $CO_2$ $\frac{44}{400} \times 10,000 =$ 1,000 kilograms or 2,000 cub. met.

kw. h. for CO at 1100° C. $\frac{366}{864} \times 10,000 = 4,236$ kw. h.

The totals for expensive consumptions of 10,000 cubic meters of carbon monoxide are therefore as follows:

kw. h.=18,816 kw. h.
Coke=3,420 kilograms and per cubic meter
1.9 kw. h.
.35 kilogram of coke

*Example III*

With regard to CO resulting from the manufacture of calcium carbide according to the formula $$CaO + 3C = CaC + CO$$

to the extent of 275 cubic meters per ton of 80% carbide, the expensive super-consumption remains lower than the quantity of heat derived by the gas extracted at 1100° C. namely to:

$$\frac{366}{864} \times 275 = 117 \text{ kilowatt-hours}$$

or for one cubic meter .43 kilowatt-hour.

*Example IV*

For the same carbide from calcareous material and according to the formula $$CaO.CO + 4C = CaC + C.CO$$

leading to 825 cubic meters of CO per ton of 80% carbide, the super-consumption only relates to the kilowatt-hours since the fourth atom of carbon substantially corresponds to that quantity of coke which would be used up for producing quick lime.

However, to the super-consumption which is three times as large for heat derived from an extraction of carbon monoxide which is also three times as large, namely 351 kw. h. there must be added the one following the decomposition of 1600 kilograms of calcareous substance, namely $$\frac{42,500}{864} \times \frac{1600}{100} = 787 \text{ kw. h.}$$

as well as the one following the conversion of $CO_2$ into 2CO namely:

$$\frac{45}{44} \times 550 \times \frac{100}{70} = 803 \text{ kw. h.}$$

making a total for each ton of 80% carbide of $$351 + 787 + 803 = 1941 \text{ kw. h.}$$

or reckoned per cubic meter $$\frac{1941}{825} = 236 \text{ kw. h.}$$

It will be understood that the extraction method using downdraft or, in other words, inverted draft in the improved gas producer according to the invention is the only one which permits a complete reduction of $CO_2$ from calcareous substance to be achieved.

*Example V*

Assuming now 45% ferro-silicon to be dealt with according to the following formula $$SiO_2 + 2C = Si + 2CO$$

which leads to $$\frac{44}{28} \times 450 = 707 \text{ cubic meters}$$

or carbon monoxide per ton of alloy obtained, the expensive super-consumption is reduced, as for calcium carbide, from quick lime, to the heat derived by the carbon monoxide extracted at 1100° C. that is to say to $$\frac{366}{864} \times 707 = 300 \text{ kw. h.}$$

or per cubic meter $$\frac{300}{707} = .43 \text{ kw. h.}$$

It will be understood that the foregoing examples are not to be construed in too rigorous a sense and, moreover, that they are not limitative. The electrothermic gas producer according to the invention is also suitable for the extraction of metallic vapors such as zinc or magnesium vapors or other so-called industrial gases. It thus becomes possible to instantaneously determine the advantages which can be derived depending upon circumstances and contemplated productions. These advantages can be obtained with none of the formerly devised electrothermic appliances which were lacking in reliability, safety, operational flexibility and easiness of adaptation.

What is claimed is:

1. In an electric furnace having a furnace space open to the atmosphere, an electrode centrally entering the furnace space through such opening and occupying a major portion of the cross section of the opening, a plurality of upwardly extending gas collector openings through the furnace wall surrounding the electrode, fittings on such openings having gas connections to a collector pipe and a port opening to the exterior of the furnace, said gas collector openings being flared downwardly through the wall and closures on said ports operable from the exterior, whereby poking tools may be inserted into said furnace space from the exterior.

2. An electric furnace according to claim 1 wherein valves are provided, attached to said fittings, said valves being adapted to shut off the furnace space from the collector pipe.

3. An electric furnace having a furnace space open to the atmosphere, an electrode centrally entering said furnace space through such opening and occupying a major portion of the cross section of said opening, a plurality of upwardly extending gas collector openings through the furnace wall surrounding the electrode, fittings on said openings having a port opening to the exterior of the furnace, said gas collector being flared downwardly through the wall, closures on said ports operable from the exterior whereby poking tools may be inserted into the furnace space from the exterior and a main gas collecting pipe surrounding said furnace and in communication with said fittings.

4. An electric furnace according to claim 3 wherein the furnace space is in the form of a shaft and said fittings are located at the upper part of the walls of the shaft and are arranged symmetrically in a circle around the shaft.

5. A furnace in accordance with claim 1 wherein the furnace has side walls with refractory lining, and a bottom hearth of conducting material which forms part of the electric circuit through the furnace.

6. A furnace in accordance with claim 1 wherein the furnace has side walls with refractory lining and a hearth of conducting material which forms part of the electric circuit through the furnace and wherein said centrally located electrode is movable and formed with a passage through which fluid may be introduced into the furnace space.

7. An electric furnace having a furnace space open to the atmosphere, an electrode centrally entering the furnace space through such opening and occupying a major portion of the cross section of the opening, a plurality of upwardly extending gas collector openings through the furnace wall surrounding the electrode, fittings on such openings having gas connections to a collector pipe and a port opening to the exterior of the furnace, said gas collector openings being flared downwardly through the wall, closures on said ports operable from the exterior, whereby poking tools may be inserted into said furnace space from the exterior, valves in said connections, operating means for said valves and means connecting said last named means with closure for locking said closures in closed position when said valves are open.

8. An electric furnace having walls, said walls having an upper frusto-conical portion forming a heating chamber, current supplied electrodes in said furnace, suction pipes leading through said walls and communicating with said chamber, a valve in each of said pipes and formed with a casing having a relatively thin outer flange secured to said frusto-conical portion, said flange being formed with a port communicating with said chamber and adapted for the insertion of poking tools, closures for said ports and pivoted weights cooperating with said closures and urging said closures to closed position.

9. The electric furnace as claimed in claim 8 wherein two poking ports are provided at opposite sides of each valve and the closures are formed of disks covering their respective ports and valve actuating means is provided, which comprises a V-shaped member the arms of which are mounted to swing over said disks to hold said disks in closed position.

10. The electric furnace as set forth in claim 8 wherein fluid supply pipes are provided and said valve is common to said suction and fluid supply, and said valve comprises a casing having side openings communicating with said suction and supply pipes and said casing having a conical valve seat and a rotary hollow member on said seat formed with two separate passageways communicating with said chamber and said member being movable to place said passageways in and out of communication with said openings, respectively.

PAUL LOUIS JOSEPH MIGUET.
MARCEL PAUL PERRON.

REFERENCES CITED

The following references are of record in the file of this patent:

UNITED STATES PATENTS

| Number | Name | Date |
|---|---|---|
| 1,082,195 | Helfenstein | Dec. 23, 1913 |
| 1,223,278 | Helfenstein | Apr. 17, 1917 |
| 1,430,971 | Formander | Oct. 3, 1922 |
| 1,562,684 | Brown | Nov. 24, 1925 |
| 1,806,210 | Miguet | May 19, 1931 |

FOREIGN PATENTS

| Number | Country | Date |
|---|---|---|
| 31,347 | Sweden | Apr. 16, 1910 |
| 37,223 | Sweden | Apr. 19, 1910 |
| 52,930 | Norway | Aug. 14, 1933 |